United States Patent [19]  
Sundet

[11] 4,385,148  
[45] May 24, 1983

[54] REVERSE OSMOSIS MEMBRANE PREPARATION

[75] Inventor: Sherman A. Sundet, Wilmington, Del.

[73] Assignee: E. I. Du Pont de Nemours and Company, Wilmington, Del.

[21] Appl. No.: 278,433

[22] Filed: Jun. 25, 1981

[51] Int. Cl.³ .............................................. C08K 5/20
[52] U.S. Cl. .................................. 524/233; 524/436; 210/500.2
[58] Field of Search ................... 260/32.6 NA; 525/4; 524/233

[56] References Cited

U.S. PATENT DOCUMENTS 3,287,324 11/1966 Sweeney ..................... 260/32.6 NA
3,567,632 3/1971 Richter et al. ....................... 210/23
3,878,109 4/1975 Ikeda et al. ..................... 210/500 M
4,129,559 12/1978 Credali et al. ............... 260/32.6 NA Primary Examiner—Joseph L. Schofer
Assistant Examiner—N. Sarofim

[57] ABSTRACT

Reverse osmosis membrane casting solution containing dimethyl formamide solvent and hydrated magnesium chloride salt.

6 Claims, No Drawings

REVERSE OSMOSIS MEMBRANE PREPARATION

BACKGROUND OF THE INVENTION

Asymmetric membranes for use in a variety of purification operations have long been known. Permeation selective or permselective membranes preferentially pass certain components of liquid mixtures while retaining other components. In reverse osmosis membranes, a hydrostatic pressure in excess of the equilibrium osmotic pressure of the liquid mixture or solution is applied to the liquid to force the more permeable components, usually water, through the membrane in preference to the less permeable components, such as a salt, contrary to the normal osmotic flow.

In the preparation of membranes for these applications, a film or hollow fiber is first cast from a casting dope. After partial removal of the casting solvent, this film is then extracted by treating with a nonsolvent to replace the balance of the original casting solvent. A wide variety of additives has been suggested for the modification of the physical and performance characteristics of the resulting membrane. For example, various salts such as lithium chloride and lithium nitrate have been used to increase the permeability of the resulting membrane. However, while these have functioned satisfactorily in the modification of the final product, the salts typically have the undesirable characteristic of decreasing the salt rejection of the resulting membrane. In addition, some lithium salts have resulted in a lower thermal stability of the resulting membrane.

SUMMARY OF THE INVENTION

The instant invention provides an improved solution for the preparation of permselective or reverse osmosis membranes which results in membranes and hollow fibers with higher flux and improved salt rejection characteristics.

Specifically, the instant invention provides, in a membrane casting solution comprising a film and fiber-forming polyaramide, solvent, and at least one metal salt, the improvement wherein the solvent is at least about 50% dimethyl formamide and the metal salt comprises about from 1 to 50%, by weight of the solution, of hydrated magnesium chloride.

DETAILED DESCRIPTION OF THE INVENTION

The polymers used in the present membrane casting solutions are those which have previously been used in the art for the preparation of permselective and reverse osmosis membranes. These can include, for example, those aromatic nitrogen-linked polymers described in detail in Richter et al, U.S. Pat. No. 3,567,632, hereby incorporated by reference.

The solvent used for the present casting solutions should comprise at least about 50% dimethyl formamide. Other solvents can be used in conjunction with the dimethyl formamide which are compatible with the principal solvent. For example, N-methylpyrrolidone and dimethyl sulfoxide can be used in quantities of up to about 50% of the total solvent without negating the benefits of the magnesium salts of the present invention. Preferably, however, the dimethyl formamide comprises at least about 90% of the solvent used, and particularly desirable results are obtained when the solvent used is substantially pure dimethyl formamide.

A central feature of the membrane casting solutions of the instant invention is the inclusion of hydrated magnesium chloride as a porosity control agent. This salt is commercially available in the form of the hexahydrate, but can also be used with from three to six moles of water of hydration. The low solubility of anhydrous magnesium chloride makes it unsuitable for use in the present casting solutions. This salt results in flat membranes and hollow fibers which exhibit higher flux and improved salt rejection over membranes prepared from solutions having the salt additives previously used in the art.

The overall composition of the present casting solutions can vary, depending on the particular polymer used and the casting operation for which the solution is intended. However, in general, the casting solution comprises about from 50 to 80% solvent, 5 to 50% polymer and 1 to 50% of the required magnesium salt. Preferably, the solution comprises about from 15 to 35 weight percent polymer and about from 6 to 25 weight percent salt.

The order in which the components in the casting solution are brought together is not critical. However, it has been found convenient to prepare the solutions by first dissolving the hydrated magnesium chloride in the solvent, subsequently adding the polymer and rolling the solution containers until solution is complete. The solution can then be filtered and degassed according to conventional procedures prior to formation of a membrane.

The present membrane casting solutions can be used to prepare either flat or hollow fiber membranes according to conventional casting techniques. The resulting membranes exhibit higher flux and improved salt rejection characteristics over previous membranes, and, in addition, show higher salt rejection than membranes prepared from casting solutions using magnesium chloride as opposed to the presently required hydrated magnesium chloride. In addition, the hydrated magnesium chloride results in less shrinkage of the formed membrane when it is subjected to the customary annealing.

The present invention is further illustrated in the following examples, in which parts and percentages are by weight unless otherwise indicated.

EXAMPLES 1–3 and COMPARATIVE EXAMPLES A–C

Asymmetric membranes were prepared from an aromatic copolyamide of metaphenylene diamine and isophthalic and terephthalic acids in the ratio of 70:30, with enough metaphenylene diamine-4-sulfonic acid present to yield a product containing 2.5 weight percent sulfur and an inherent viscosity at 25° C. of 1.3 dl/g as measured in a solution of 0.5 grams in 100 milliliters of dimethyl acetamide containing 4% lithium chloride. Solutions were prepared by dissolving 15 parts by weight of the polyamide in 85 parts by weight N,N-dimethyl formamide, adding the porosity-modifying salts and rolling the containers unitl dissolved. These solutions were then filtered through a 5-micron porosity Milliport Mitex ® filter membrane, and the resulting filtrate degassed with 20–25" of mercury vacuum for 5–10 minutes.

Films were cast with a Gardner knife set for 10 mils on a clean glass plate at 100° C. The films were dried for the times indicated before quenching in water at 8°–10°

C. After extraction in the quench water for 60 minutes, with the temperature increasing to 18°-20° C., the films were annealed in water at 55° C. for 30 minutes before storing in water containing a few drops of formalin per quart.

These membranes were compared for hyperfiltration properties in 50 mm diameter cells using water with NaCl at 1.5 g/l at a pressure of 800 lbs/in². The properties were tested and are summarized in Table I.

TABLE I

| Example | Salt | Wt %* MgCl$_2$ | Membrane Dry Time (min) | Flux (m/s) | Salt Passage (%) |
|---|---|---|---|---|---|
| 1 | MgCl$_2$ (6H$_2$O) | 20 | 3 | 11.19 | 1.2 |
| | | | | 9.93 | 1.3 |
| | | | | 10.91 | 1.8 |
| A | MgCl$_2$ | 20 | 3 | 9.61 | 2.8 |
| | | | | 10.05 | 3.4 |
| | | | | 11.05 | 5.3 |
| 2 | MgCl$_2$ (6H$_2$O) | 30 | 2 | 18.04 | 1.4 |
| | | | | 15.51 | 1.8 |
| | | | | 20.09 | 1.6 |
| B | MgCl$_2$ | 30 | 2 | 21.05 | 3.2 |
| | | | | 17.68 | 5.4 |
| | | | | 26.79 | 4.0 |
| 3 | MgCl$_2$ (6H$_2$O) | 30 | 3 | 15.51 | 1.4 |
| | | | | 12.28 | 1.6 |
| | | | | 14.03 | 0.9 |
| C | MgCl$_2$ | 30 | 3 | 16.07 | 4.4 |
| | | | | 13.19 | 4.9 |
| | | | | 17.68 | 3.8 |

*Based on polymer

EXAMPLES 4-9 and COMPARATIVE EXAMPLES D-G

In Examples 4-9 and Comparative Examples D-G, membrane solutions were prepared using the same polymer as in Examples 1-3 and the magnesium or lithium salts indicated in Table II. The concentrations are listed as parts per hundred of resin (pphr). The magnesium chloride and water were added as the magnesium chloride hexahydrate, whereas water and lithium chloride were added separately for a closer comparison of the lithium and magnesium salts.

Membranes were cast 11 mils thick on a glass plate, dried 2 minutes at 95° C. and cooled for 90 seconds before quenching in aqueous formic acid. After extraction 60 minutes in water, they were annealed for one hour at 70° C., then tested in a stirred permeability cell at 22°-3° C. with sodium chloride solution (3.5 g/l) at feed pressures up to 800 psi to determine the permeability properties shown in Table II.

TABLE II

| Example | MgCl$_2$ pphr | LiCl pphr | Water pphr | DMF pphr | Flux Constant m·s$^{-1}$·TPa$^{-1}$ | Salt Passage (%) |
|---|---|---|---|---|---|---|
| D | — | 2.56 | 3.27 | 450 | .004 | — |
| 4 | 5.20 | — | 5.91 | 444 | 0.137 | — |
| 5 | 7.81 | — | 8.86 | 439 | 0.371 | 1.8 |
| E | — | 8.33 | 10.7 | 437 | 0.167 | — |
| 6 | 10.41 | — | 11.82 | 433 | 0.624 | 1.9 |
| 7 | 13.01 | — | 14.77 | 428 | 0.945 | 2.6 |
| 8 | 15.61 | — | 17.72 | 422 | 1.256 | 2.0 |
| F | — | 16.7 | 21.4 | 418 | 0.667 | 3.3 |
| 9 | 23.42 | — | 26.58 | 406 | 2.117 | 2.4 |
| G | — | 33.4 | 42.8 | 380 | 1.30 | 3.0 |

EXAMPLES 10-13 and COMPARATIVE EXAMPLES H-M

In Examples 10-13 and Comparative Examples H-M, membranes were prepared from solutions having either magnesium chloride hexahydrate or a mixture of lithium chloride and lithium nitrate, as indicated in Table III.

Membranes were cast 15 mils thick on a glass plate, dried 2 minutes at 95° C. under a nitrogen atmosphere and cooled for 90 seconds before quenching. After extraction in water, they were annealed for 4 hours at 65° C., then tested in a stirred permeability cell with sodium chloride solution (3.3 g/liter) at 22°-3° C. with feed pressures up to 800 psi. The resulting permeability properties are shown in Table III.

TABLE III

| Example | LiCl pphr | LiNO$_3$ pphr | MgCl$_2$ pphr | H$_2$O pphr | DMF pphr | Flux Constant m·s$^{-1}$·TPa$^{-1}$ | Salt Passage (%) |
|---|---|---|---|---|---|---|---|
| H | — | — | — | — | 400 | 0.008 | — |
| I | 2 | 5 | — | 2.6 | 446 | 0.105 | 5.3 |
| 10 | — | — | 7.8 | 8.9 | 439 | 0.176 | — |
| 11 | — | — | 12.5 | 14.8 | 428 | 0.607 | 6.3 |
| J | 4 | 10 | — | 5.1 | 436 | 0.412 | 2.1 |
| K | 6 | 15 | — | 7.6 | 427 | 1.180 | 3.2 |
| 12 | — | — | 23.4 | 26.6 | 406 | 2.624 | 2.6 |
| L | 7 | 17.5 | — | 8.9 | 422 | 1.507 | 3.2 |
| M | 9 | 22.5 | — | 11.4 | 413 | 1.816 | 1.3 |
| 13 | — | — | 39.0 | 44.3 | 372 | 3.424 | 3.0 |

The flux levels of the membranes using magnesium chloride hexahydrate are significantly higher than the lithium salt membranes without sacrifice of salt rejection properties.

EXAMPLE 14 and COMPARATIVE EXAMPLES N and O

In Example 14, membranes were prepared from the copolyaramide used in the previous examples, using a MgCl$_2$·6H$_2$O/dimethyl formamide solution containing 39 pphr of MgCl$_2$ with 44.3 pphr of water as water of hydration and 372.2 pphr of dimethyl formamide. The solution was filtered through a 5-micron filter, cast at 15 mils onto a glass plate and dried under nitrogen at 95° C. for 2 minutes. The membranes were then cooled 90 seconds before quenching in 35% formamide. After extraction, the membranes were annealed for 4 hours, at a temperature of 65° C.

In Comparative Examples N and O, the procedure was repeated, using, instead of the magnesium salt, 6.1 pphr of LiCl and 15 pphr of LiNO$_3$ with 434.4 pphr of dimethyl acetamide. Films were prepared as in Example 14, except that the membranes were dried for 3½ minutes and annealed for 4 hours, first at 55° C. and then at 75° C.

The membranes were evaluated in a desalination procedure with a brine feed of 5.0 grams of sodium chloride per liter of water at 65° C. and 400 psi. The flux constants were evaluated with time and presented as log-log plots. The slopes of these log-log plots indicate a significantly more gradual reduction in flux with time at this high temperature evaluation. The results are summarized in Table IV.

TABLE IV

| Example | Salt/Solvent | Annealing Temperature | Slope |
|---|---|---|---|
| 14 | MgCl$_2$/DMF | 65° C. | −.056 |
| N | LiCl + LiNO$_3$/DMAc | 55° C. | −.095 |
| O | " | 75° C. | −.070 |

EXAMPLES 15–17 and COMPARATIVE EXAMPLE P

A solution of the copolyaramide used in the previous Examples containing 23.5 pphr of MgCl$_2$ and 26.5 pphr of water (added as MgCl$_2$·6H$_2$O) in 300 pphr of dimethyl formamide was spun into hollow fibers in a dry spinning cell. The fibers exiting the cell were quenched in 8° water, extracted and annealed at 50° C. The procedure was repeated in Comparative Example P, except that 6 pphr of LiCl and 15 pphr LiNO$_3$ were used instead of the MgCl$_2$·6H$_2$O. The hollow fibers were tested in small scale permeators, and the results summarized in Table V.

TABLE V

| Example | Flux Constant m·s$^{-1}$·TPa$^{-1}$ | Salt Passage (%) | Collapse Pressure psi |
|---|---|---|---|
| P | 0.953 | 3.5 | 800 |
| 15 | 1.64 | 6.1 | 800 |
| 16 | 1.45 | 4.5 | 650 |
| 17 | 1.39 | 3.5 | 750 |

I claim:

1. In a membrane casting solution comprising a film and fiber-forming polyaramide, solvent, and at least one metal salt, the improvement wherein the solvent is at least about 50% dimethyl formamide and the metal salt comprises about from 1 to 50%, by weight of the solution, of hydrated magnesium chloride.

2. A casting solution of claim 1 wherein the solvent is at least about 90% dimethyl formamide.

3. A casting solution of claim 2 wherein the solvent is substantially pure dimethyl formamide.

4. A casting solution of claim 1 wherein the hydrated magnesium chloride is magnesium chloride hexahydrate.

5. A casting solution of claim 4 comprising about from 5 to 50% polymer, about from 50 to 80% solvent and about from 1 to 50% magnesium chloride hexahydrate.

6. A casting solution of claim 1 wherein the polyaramide consists essentially of an aromatic copolyamide of metaphenylene diamine, isophthalic and terephthalic acids, and metaphenylene diamine-4-sulfonic acid.

* * * * *